United States Patent [19]

Tsuji et al.

[11] Patent Number: 4,998,806
[45] Date of Patent: Mar. 12, 1991

[54] IMAGE READING APPARATUS

[75] Inventors: Shigeki Tsuji, Hiroshima; Yukio Kurata, Nara; Taizo Yokota, Hiroshima, all of Japan

[73] Assignee: Sharp Kabushiki Kaisha, Osaka, Japan

[21] Appl. No.: 458,442

[22] Filed: Dec. 28, 1989

[30] Foreign Application Priority Data

Jan. 6, 1989 [JP] Japan ................................. 1-1678

[51] Int. Cl.$^5$ ............................................. G02B 3/08
[52] U.S. Cl. .................................... 350/413; 350/452
[58] Field of Search ..................... 350/413, 162.17, 452

[56] References Cited

FOREIGN PATENT DOCUMENTS 0046403 2/1988 Japan .................................... 350/452

Primary Examiner—Bruce Y. Arnold
Assistant Examiner—Rebecca D. Gass

[57] ABSTRACT

This image reading apparatus includes a light source for illuminating an object, a lens array for focusing reflected light from the object into a predetermined position, and an image sensor for reading an image formed by the focused light. The lens array includes a transparent base (and a diffraction element provided on at least an incident plane and an emission plane of the base. The lens array includes an array having a plurality of lens areas. The employment of the diffraction element renders a shorter imaging distance of light from the object and thus a reduction in the size of the apparatus.)

8 Claims, 10 Drawing Sheets

IMAGE READING APPARATUS

BACKGROUND OF THE INVENTION

1. Field of the Invention

The present invention relates generally to image reading apparatuses and, more particularly to reducing the size of and simplifying the structure of a lens array in an image reading apparatus for illuminating an image with light from an illuminating light source, imaging light from the image onto a line sensor through the lens array and electrically reading image information.

2. Description of the Background Art

Office machines or communication apparatuses such as copiers or facsimiles include image reading apparatuses which optically read image information represented on the original of paper or drawings and convert the read information into an electric signal to be taken out. While there are various types of the image reading apparatuses, the image reading apparatus with a representative structure includes a light source, an optical lens and an image sensor. As to an operation of the image reading apparatus, in general, the apparatus illuminates the original having image information with white light from the light source, projects reflected light thereof being optically reduced in size onto a line sensor such as a CCD (Charge Coupled Device) image sensor through the optical lens, converts this projected light into an electrical signal and reads image information.

However, in an optical system employing a spherical lens as the optical lens, a spacing between the original and a light acceptance plane of image information is increased, resulting in an increase in the size of the apparatus. In order to avoid this increase in the size of the apparatus, a reflecting mirror for bending an optical path of light rays from an image is usually employed in the optical system to reduce the size of the apparatus. However, the provision of a device such as the reflecting mirror results in a complicated structure of the apparatus with a disadvantage that the apparatus is not effectively made compact.

Meanwhile, in recent years, due to practical application of a focusing lens for conducting light, an image reading apparatus, the size of which is reduced by integrally forming a reading optical system and an equal-scale magnification adhesion type reading line sensor together, has been in practical use. This image reading apparatus will now be described with reference to FIGS. 15 to 17.

Figure 15:
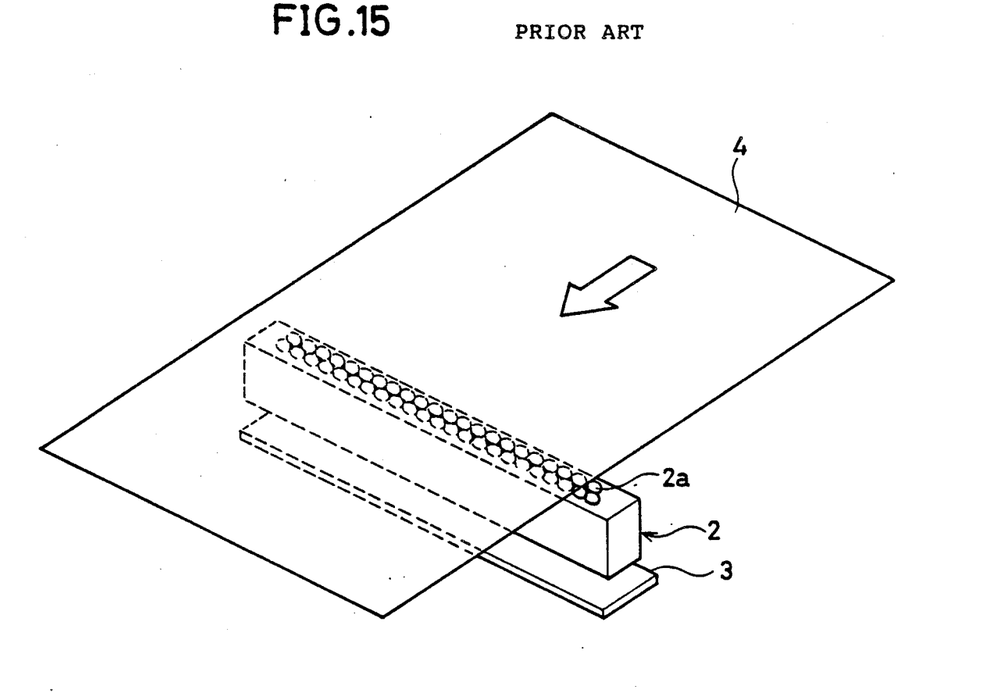
FIG. 15 is a perspective view of a schematic structure of a conventional image reading apparatus.

Referring to FIG. 15, this image reading apparatus includes a light emitting diode 1 (not shown) to serve as a light source, a refractive index profile type lens array 2 constituting the optical system, and a line sensor 3 including a plurality of CCD image sensors for converting image information into an electric signal.

Figure 16:
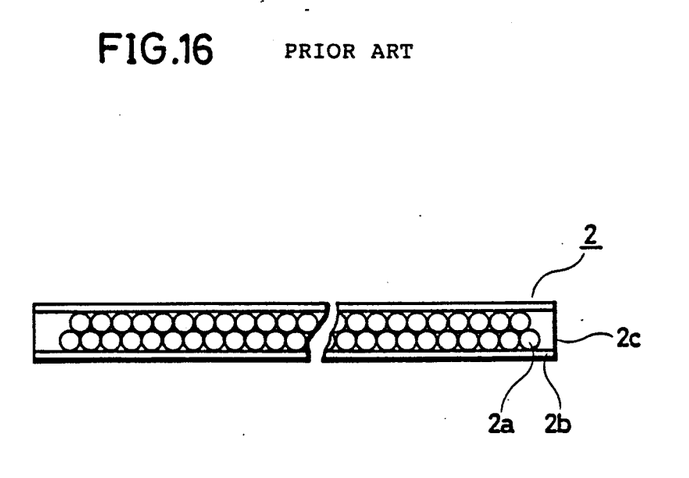
FIG. 16 is a front view of a refractive index profile type lens array employed in the conventional image reading apparatus.

Next, referring to FIG. 16, the refractive index profile type lens array 2 includes a large number of focusing lens elements 2a of a cylindrical shape with a diameter of approximately 1 mm. These focusing lens elements 2a are interposed between frame plates 2b on both sides thereof. The frame plate 2b is formed of a glass fabric based epoxy resin black lamination plate (FRP) having almost the same thermal expansion property as the focusing lens element 2a so as to reduce thermal distortion and increase the strength thereof Black silicon rubber resin 2c is filled in spaces between the focusing lens elements 2a and the frame plate 2b. This silicon rubber resin 2c serves to remove flare light around the focusing lens elements 2a.

Figure 17:
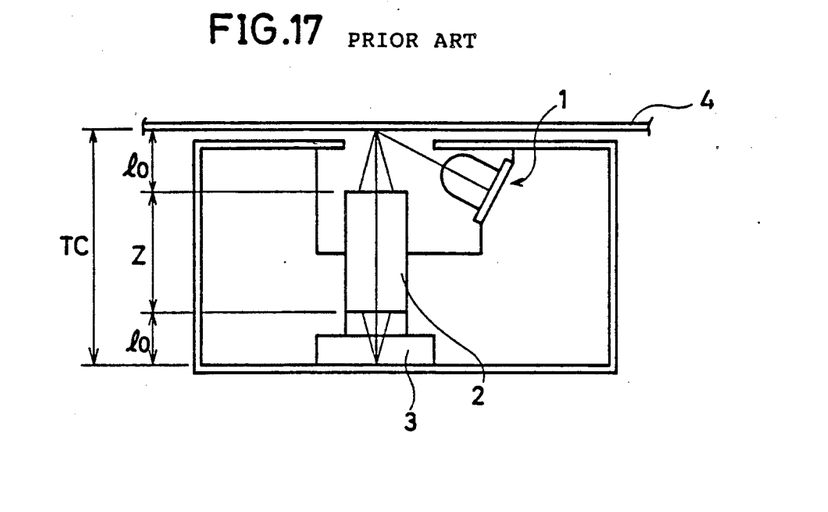
FIG. 17 is a sectional view of a schematic structure for the operation of the conventional image reading apparatus.

An operation of the image reading apparatus will now be described with reference to FIG. 17. Illumination light is first directed from the light emitting diode 1 to the surface of the original 4. Light from the image, reflecting on the surface of the original 4, is introduced into the refractive index profile type lens array 2 to be focused. This light is then transmitted through the refractive index profile type lens array 2 and is then imaged on the surface of the line sensor 3. The line sensor 3 converts this light from the image into an electrical signal to read image information.

A conjugate length TC of the optical system employing this refractive index profile type lens array 2 is expressed as $TC = Z + 2l_o$ and is approximately 15-70 mm. This enables a distance between a plane of the original and a plane on which an image is read to be shorter compared to the conventional spherical lens, resulting in a smaller-scale image reading apparatus.

However, while the image reading apparatus employing the refractive index profile type lens array 2 can be reduced in size, it provides a disadvantage that the manufacturing cost of the apparatus is increased due to a difficulty in manufacturing the refractive index profile type lens array 2.

Some causes of the above disadvantage are described as follows a The refractive index profile type lens array 2 includes three materials, the focusing lens elements 2a, the frame plate 2b and the silicon rubber resin 2c and thus is complicated to manufactured; and b. All the focusing lens elements 2a are required to have uniform properties so as to have an equal refractive index profile constant and also an increased accuracy in the manufacture.

Further, the refractive index profile type lens array 2 also has another disadvantage that the removal of the flare light by the black silicon rubber resin 2c as a filler decreases an efficiency in utilizing an incident light.

SUMMARY OF THE INVENTION

It is an object of the present invention to reduce the size of an image reading apparatus.

It is another object of the present invention to enhance an efficiency in manufacturing a lens array employed for an image reading apparatus.

It is a further object of the present invention to enhance an efficiency in convergence of a lens array employed for an image reading apparatus.

It is a still further object of the present invention to simplify a structure of a lens system of an image reading apparatus.

The image reading apparatus according to the present invention comprises a light source for directing illumination light onto a surface of an object, a lens array for focusing and transmitting light reflected on the surface of the object to form an image of the object at a predetermined position, and an image sensor, provided at a predetermined position, for converting the image formed on the surface thereof into an electrical signal to read the image of the object. The lens array comprises a transparent base having a plane of incidence which the reflected light of the image enters and a plane of emission from which the reflected light of the image exits, a first diffraction element provided at a position which the reflected light of the base enters, and a second diffraction element provided at a position from which the reflected light on the emission plane of the base emits.

Those diffraction elements each have a curved diffraction grating with uniform micro-spacings on the surface of the transparent base and thus obtain the action of a lens and a flection of an optical path by employing a diffraction of a light wave due to this diffraction grating. Since the angle of diffraction of the light wave depends only on the spacings in the grating, the diffraction elements can easily be comparatively manufactured or duplicated, and thus are suitable for mass production. The present invention enables, by utilizing the characteristics of the diffraction elements, a reduction in the distance between the original and the image sensor of the image reading apparatus and in the size of the apparatus, and the mass production.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will now be described with reference to the figures.

The first embodiment of the present invention will be described with reference to FIGS. 1–3.

Figure 1:
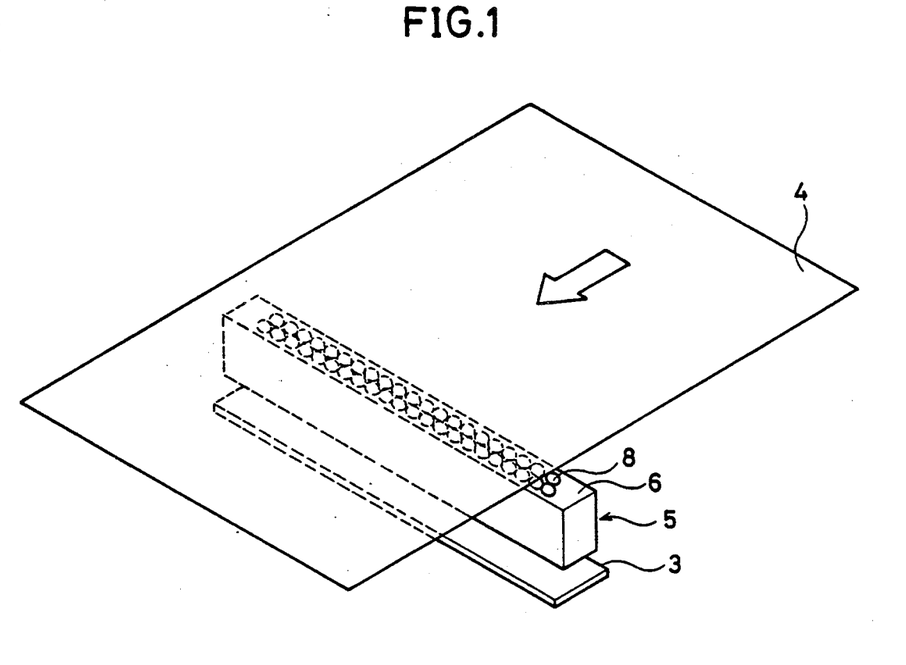
FIG. 1 is a perspective view of a schematic structure of an image reading apparatus according to a first embodiment in connection with the present invention.

Referring to FIG. 1, the image reading apparatus includes a light emitting diode 1 (not shown) and a line sensor 3 including a diffraction element array 5 and a CCD image sensor. The line sensor 3 is provided at a position opposing to the original 4 through the diffraction element array 5.

Figure 2:
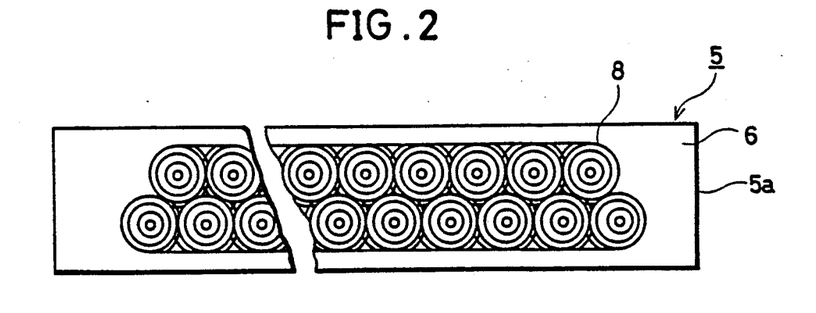
FIG. 2 is a plan view of a diffraction element array employed in the image reading apparatus of the first embodiment.
Figure 3:
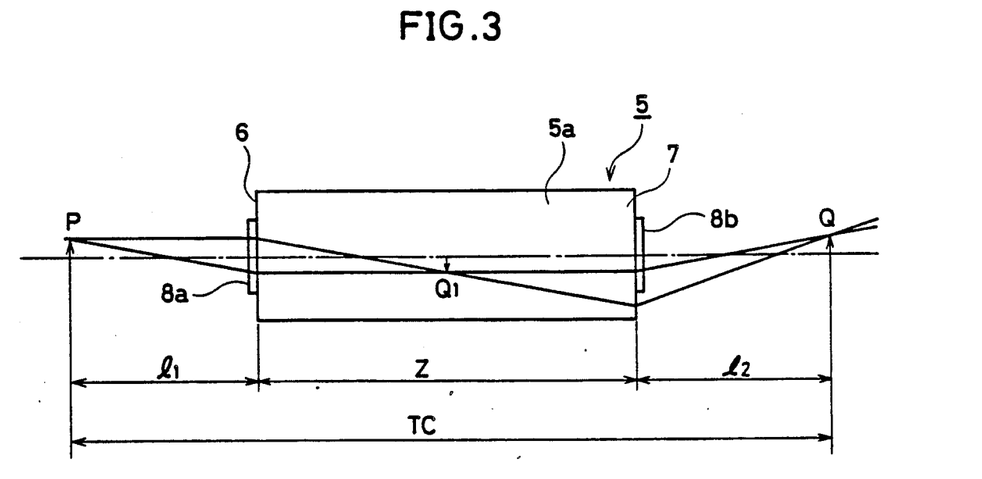
FIG. 3 is a view for illustrating imaging of light from an image in the image reading apparatus shown in FIG. 1.

Referring to FIG. 2, the diffraction element array 5 includes a rectangular base 5a formed of a transparent material such as glass or plastic. One plane of the base 5a in an elongated direction includes a plane 6 of incidence, while the other plane opposite this incident plane 6 includes a plane 7 of emission. A plurality of diffraction elements 8 such as Fresnel lenses are arranged planar on the surfaces of the incident plane 6 and the emission plane 7. The diffraction elements 8 cover the overall surfaces of the incident plane 6 and the plane 7 of emission.

The action of this diffraction element array 5 will now be described with reference to FIG. 3. Image information P on the surface of the original 4 which accepts illuminating light from the light emitting diode is directed toward the incident plane 6 of the diffraction element array 5, transmissively through a diffraction element 8a provided on this incident plane 6 and enters the diffraction element array 5. After forming an inverted real image $Q_1$ of the image information P within the diffraction element array 5, the image information P is transmitted through a diffraction element 8b formed on the plane 7 of the diffraction element array 5 to form an erecting real image at the position of Q. The image information P is then photoelectrically converted by the line sensor 3 (not shown) placed in the position of Q to be read. In this figure, a distance between the image information P on the surface of the original 4 and the erecting real image formed on the line sensor 3, i.e., the conjugate length TC is represented by a total sum of a differential distance $l_1$ on the side of an object a differential distance $l_2$ on the side of an image and a thickness Z of the base of the diffraction element array 5. The differential distances $l_1$ and $l_2$ on the respective sides of the object and the image are determined by the form of the grating of the diffraction elements 8a and 8b provided respectively on the incident plane 6 and the emission plane 7 of the diffraction element array 5.

Each diffraction element such as a Fresnel lens has the form of uniform micro-spaced and curved gratings. A method of manufacturing such an diffraction element includes the steps of producing a mold with the form of grating formed by an electron beam direct writing method, reduction type exposure and the like, and then producing a replica by employing this mold. This method enables mass production of this diffraction element and thus a considerable reduction in cost compared to the conventional refractive index profile type lens array or the like. Further, a diffraction efficiency of the diffraction element can be twice or more than the diffraction efficiency of a step type diffraction element by employing a blazed diffraction grating, and it becomes possible to inhibit cross-talk due to a diffraction of an unrequired diffraction degree, without any particular problems in practical use resulting.

As illustrated in FIG. 2, the diffraction elements 8 are formed without any spacing over the entire surface of the incident plane 6 or the emission plane 7 of the base 5a. This formation enables utilization efficiency of light to be enhanced when compared to the conventional refractive index profile type lens array 2.

Figure 4:
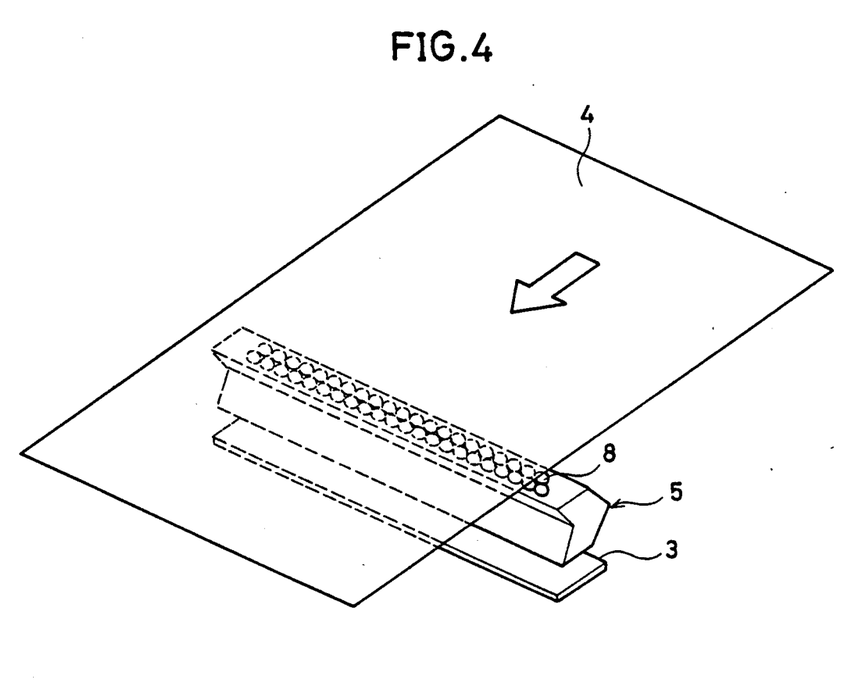
FIG. 4 is a perspective view of a schematic structure of an image reading apparatus according to a second embodiment of the present invention.
Figure 5:
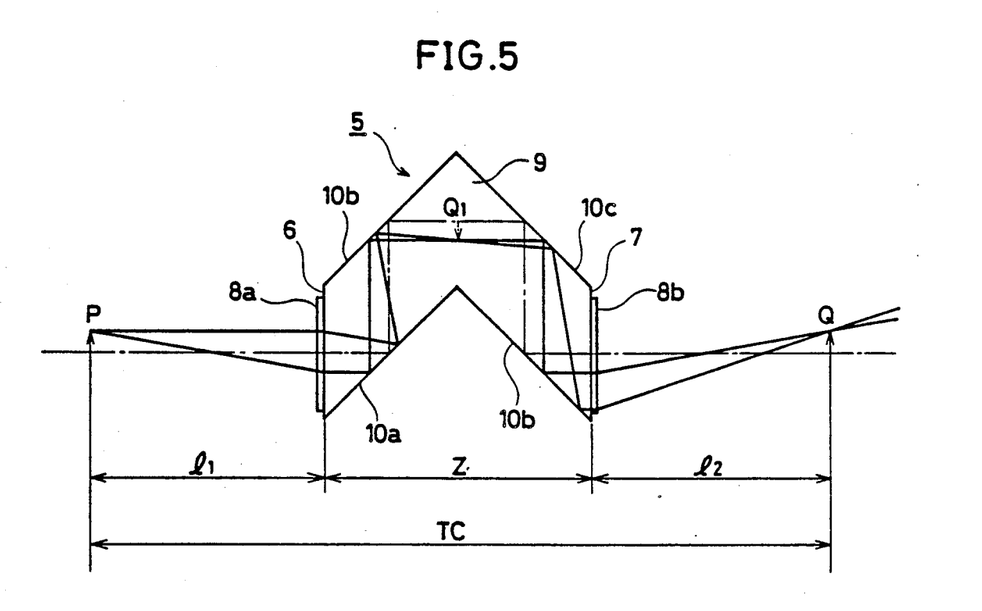
FIG. 5 is a view of a light from an image, which is imaged by a diffraction element array 5 employed in the image reading apparatus of the second embodiment.

The image reading apparatus of the second embodiment in accordance with the present invention will now be described with reference to FIGS. 4 and 5. This embodiment is featured by employing a prism 9 for the base 5a of the diffraction element array 5 compared to the first embodiment. The overall structure of the apparatus is identical to the structure of the first embodiment, as illustrated in FIG. 4. Referring to FIG. 5, the prism 9 of this embodiment is a polygonal prism including a plane 6 of incidence, a plane 7 of emission, and four planes of reflection, 10a, 10b, 10c and 10d. Diffraction elements 8a and 8b are provided respectively on the incident plane 6 and the emission plane 7 of this prism 9. In operation, an optical path of light from an image, which is transmitted through the diffraction element 8a formed on the incident plane 6 and then enters the prism 9 is first bent at the reflection plane 10a of the prism 9 and then at the reflection plane 10b to once form an inverted real image $Q_1$. Further, this optical path is then bent at the reflection planes 10c and 10d and is transmitted through the diffraction element 8b formed on the emission plane 7. The light transmitted is then introduced outside to form an erecting image at a predetermined position of Q. In the diffraction element array 5 employing this prism 9, a shorter straight distance of the optical path is achieved thereon due to the bending of the optical path of the light within the prism 9. Consequently, a thickness Z of the prism 9 can be reduced compared to that of the diffraction element array 5 illustrated in FIG. 3. This results in a reduction in the conjugate length TC of the diffraction element array and thus a reduction in the size of the apparatus.

Figure 6:
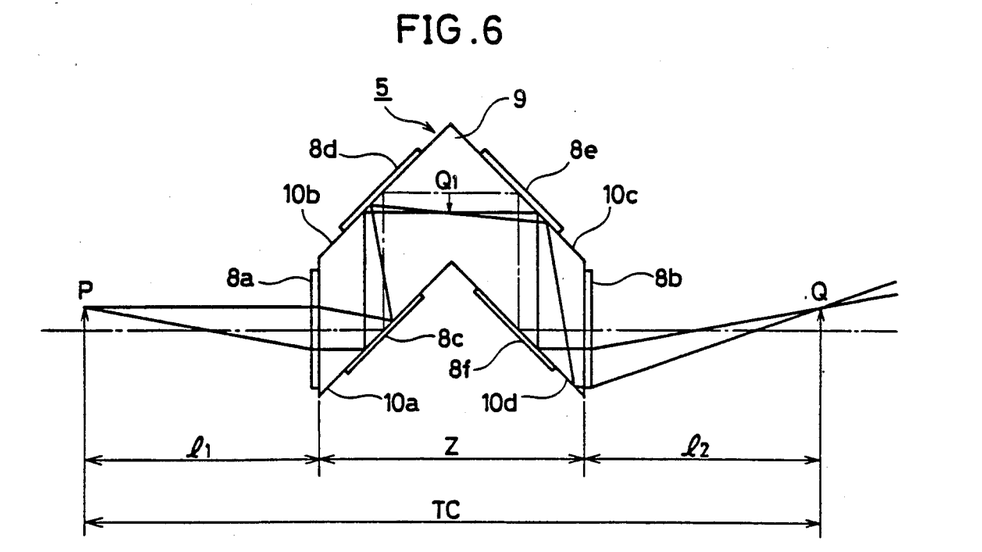
FIG. 6 is a view of light from an image, which is imaged by the diffraction element array 5 employed in an image reading apparatus of a third embodiment which is a variation of the second embodiment.

The third embodiment, which is a variation of the second embodiment, is illustrated in FIG. 6. In this embodiment, other diffraction elements 8c-8f are further provided respectively on the reflection planes 10a-10d of the prism 9 illustrated in FIG. 5 so as to decrease an accuracy required for the angle of reflection in the prism. That is, in the reflection caused by utilizing the reflection planes of the prism 9 shown in FIG. 5, a position of the imaging point Q is deviated due to an angular error of the reflection planes. However, in a flection of a luminous flux utilizing a diffraction by hologram employing the diffraction element, in general, a direction of the diffraction of the luminous flux is determined by spacings in a grating, so that this direction is least affected by an angular error of a plane on which the diffraction element is formed. Such an effect in the diffraction element enables a decrease in the accuracy of the reflection angle of the prism and a reduction in manufacturing cost thereof.

Further, it is possible to form gratings on the diffraction elements 8c-8f provided on the reflection planes of this prism 9 so that these diffraction elements 8c-8f may serve as lenses in the same manner as the diffraction elements 8a and 8b provided respectively on the incident plano 6 and the emission plane 7. Such a construction results in enhanced mass-productivity in the form of the diffraction elements 8a-8f provided on the incident plane 6, the emission plane 7 and the reflection planes of the prism 9, respectively. This further causes the differential distances $l_1$ and $l_2$ on the respective sides of the object and the image to be adjustable in a wider range, so that the differential distances can arbitrarily be determined in accordance with the structure of the system of the image reading apparatus.

Moreover, the transmissive structure of the plurality of diffraction elements 8a-8f shown in FIG. 6 prevents an occurrence of chromatic aberration. That is, the diffraction elements, in general, can eliminate in principle the chromatic aberration for light with a single wavelength. However, a general image reading apparatus employs a light emitting diode which emits light with multiwavelength to an illuminating light source for the original. Therefore, the chromatic aberration occurs with only a diffraction element on one plane. Thus, grating patterns are formed on the diffraction elements so as to mutually correct the chromatic aberration by diffraction at the plurality of diffraction elements on two or more planes, so that a clearly visible image without any chromatic aberration can be read. This action will be described in more detail in the case of employing two diffraction elements, for example.

When the first diffraction element involves a change in the angle of diffraction of light in accordance with a change in wavelength, grating patterns of the first and second diffraction elements can be designed by numerical calculation of a computer so that the second diffraction element corrects this change in the angle of diffraction at the first diffraction element to direct the light toward the same focal point. This effect of correction of the chromatic aberration is not limitative to this combination of two diffraction elements, but can be attained with a combination of a plurality of diffraction elements.

Figure 7:
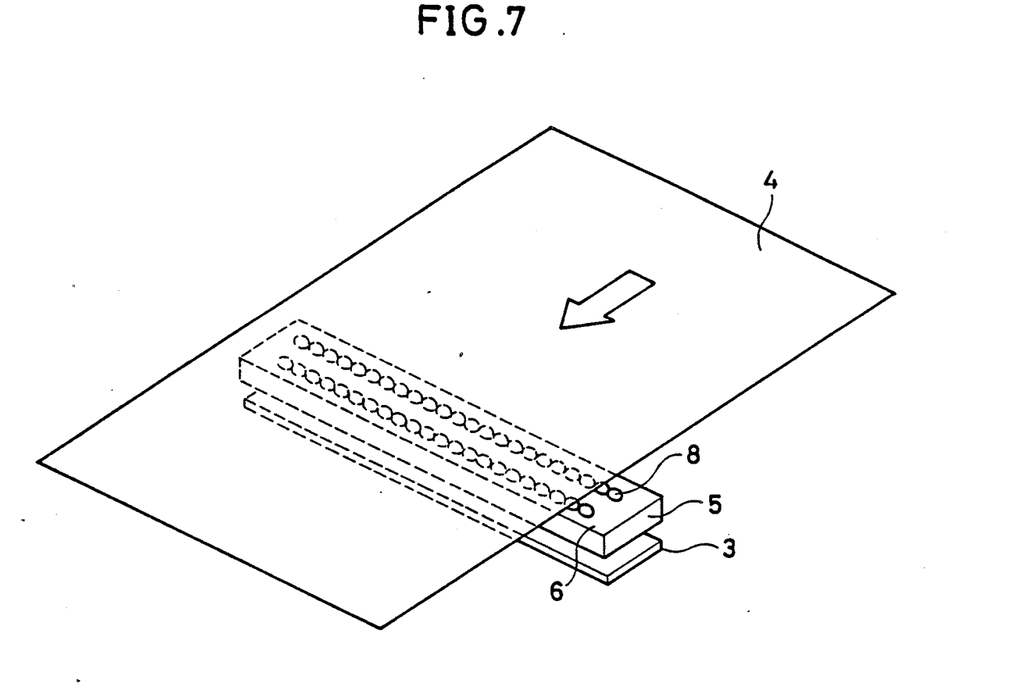
FIG. 7 is a perspective view of a schematic structure of an image reading apparatus of a fourth embodiment of the present invention.
Figure 8:
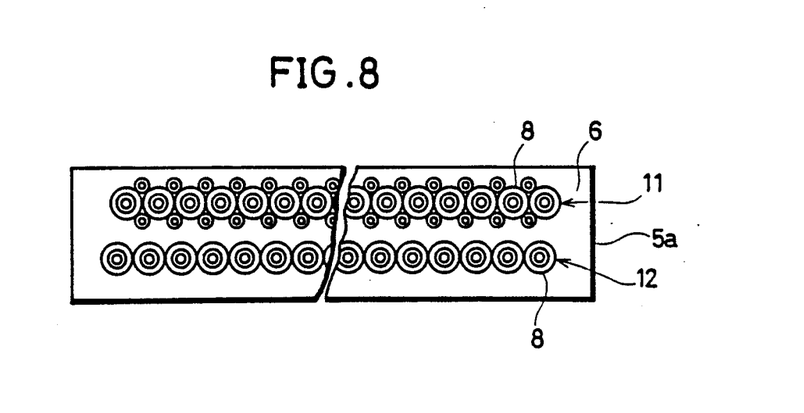
FIG. 8 is a plan view of a diffraction element array employed in the fourth embodiment.

Next, the fourth embodiment of the present invention will be described with reference to FIGS. 7-9. FIG. 7 is a perspective view of a schematic structure of the image reading apparatus of this embodiment. As illustrated in this figure, the basic structure of the apparatus of this embodiment is the same as those in FIGS. 1 and 4. The feature of this embodiment resides in the form of arrangement of the diffraction elements 8 in the diffraction element array 5 in FIG. 8. Referring to FIG. 8, the diffraction element array 5 includes a rectangular base 5a. One plane of the base 5a in an elongated direction includes a plane 6 of incidence of light from an image, while the other plane opposing to this incident plane 6 includes a plane 7 of emission (not shown). On the incident plane 6 of the base 5a are formed a diffraction element array 11 for incidence and a diffraction element array 12 for reflection, in which arrays of a plurality of diffraction elements 8 are closely arranged in series. Similarly, on the emission plane 7 of the base 5a are formed the diffraction element array 12 for reflection and a diffraction element array 13 for emission (not shown), in which arrays of the plurality of diffraction elements 8 are arranged in series.

Figure 9:
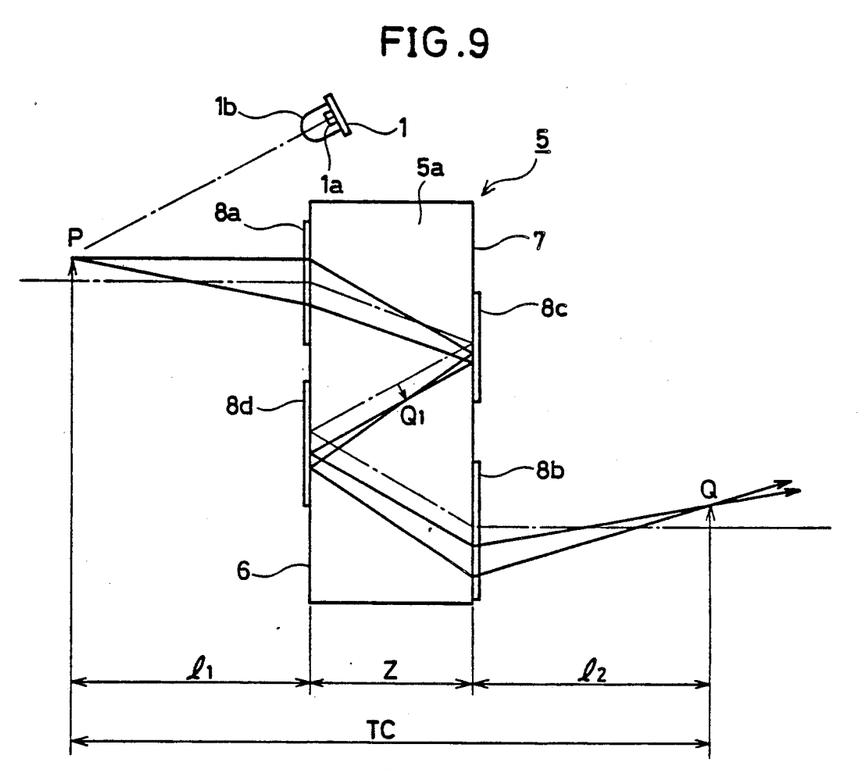
FIG. 9 is a view for illustrating imaging of light from an image in the image reading apparatus of the fourth embodiment.

Reference is now made to FIG. 9 in describing a formation of an image by employing the diffraction element array 5 in this embodiment. Image information P on the surface of the original 4 is illuminated with illumination light from the light emitting diode 1, and light from the image is then focused by and transmissively through a diffraction element 8a constituting the diffraction element array 11 for incidence, formed on the incident plane 6 of the array 5, thereby being introduced into the element 8a. The light introduced in the diffraction element 8a is diffracted by a diffraction element 8c formed on the emission plane 7 of the base 5a and then reaches a diffraction element 8d formed on the incident plane 6 of the base 5a. This light is then diffracted by this diffraction element 8d and reaches a diffraction element 8b formed on the emission plane 7 of the base 5a. After once forming an inverted real image $Q_1$ within the base 5a of the diffraction element array 5, the image information P is emitted outside by the diffraction element 8b to form an erecting real image at a predetermined position Q.

In this embodiment, an optical path of the light from the image is bent within the diffraction element array 5 by forming the diffraction elements 8c, and 8d for reflection respectively on the incident plane 6 and the emission plane 7 of the array 5, thereby reducing a straight distance of the optical path. This results in a reduction in a thickness Z of the diffraction element array 5, and consequently enables a reduction in the conjugate length TC of the diffraction element array 5, which implements a smaller-scale apparatus.

Figure 10:
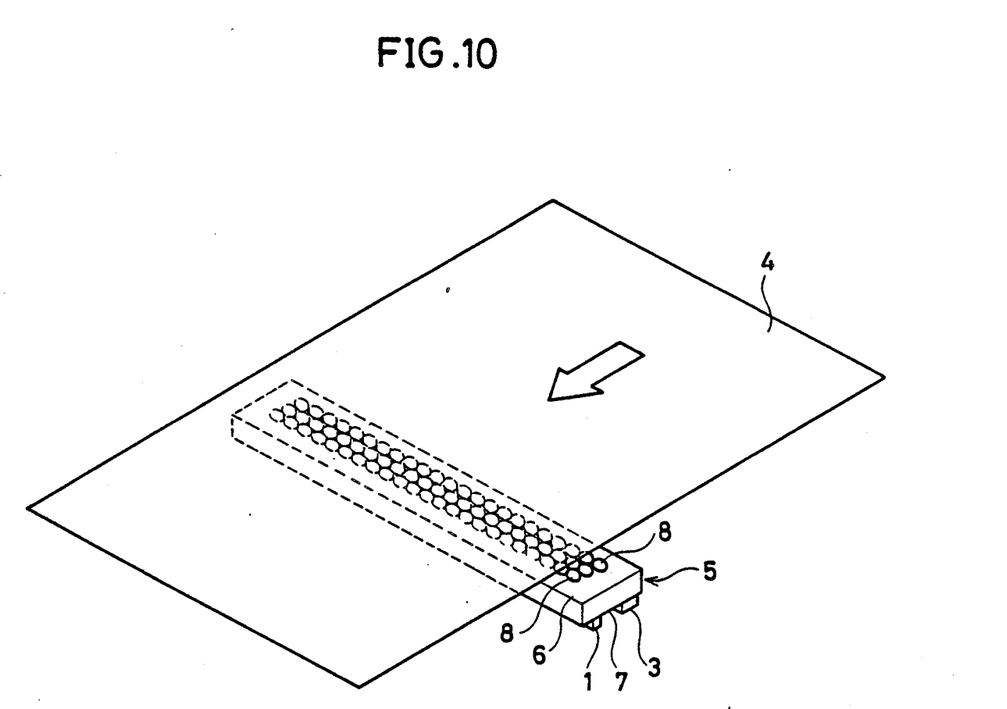
FIG. 10 is a perspective view of a schematic structure of an image reading apparatus according to a fifth embodiment of the present invention.
Figure 11:
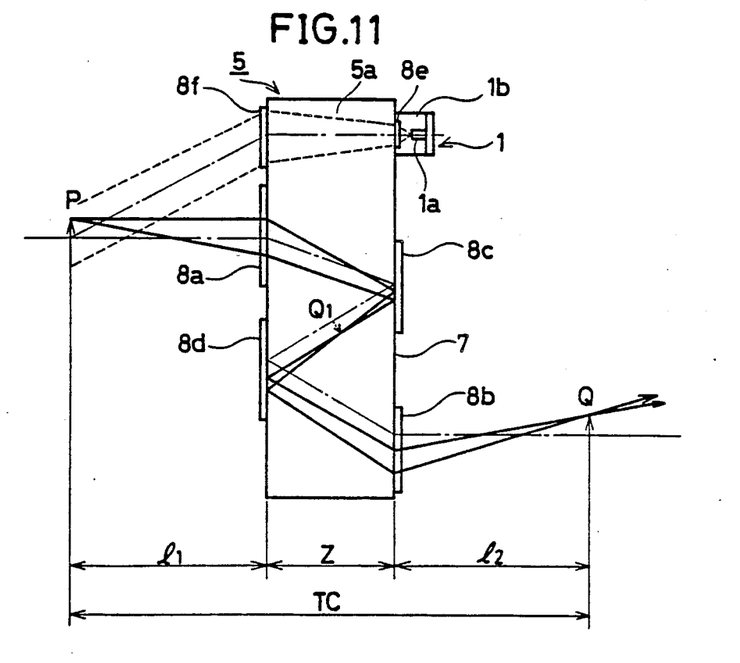
FIG. 11 is a view for illustrating imaging of light from an image by a diffraction element array employed in the fifth embodiment.

The fifth embodiment of the image reading apparatus according to the present invention will now be described with reference to FIGS. 10 and 11. This embodiment is characterized in that the light emitting diode 1 serving as a light source is integrally formed with the diffraction element array 5. That is, the light emitting diode 1 is adhesively fixed onto the emission plane 7 of the diffraction element array 5, as illustrated in FIGS. 10 and 11. The light emitting diode 1 to be attached includes a semiconductor chip 1a of the light emitting diode and a package portion 1b thereof. Diffraction elements 8e and 8f for focusing light emitted from the light emitting diode 1 are provided respectively on the emission plane 7 of the diffraction element array 5, positioned in an emission direction of the light emitting diode 1, and on the incident plane 6 of the array 5. This provision of the diffraction elements 8e and 8f requires no converging lens to be provided at an emitting position of the package of the light emitting diode 1 and thus results in a simplified structure of the light emitting diode 1. The size of the apparatus is reduced by integrally forming the light emitting diode 1 with the diffraction element array 5.

Figure 12:
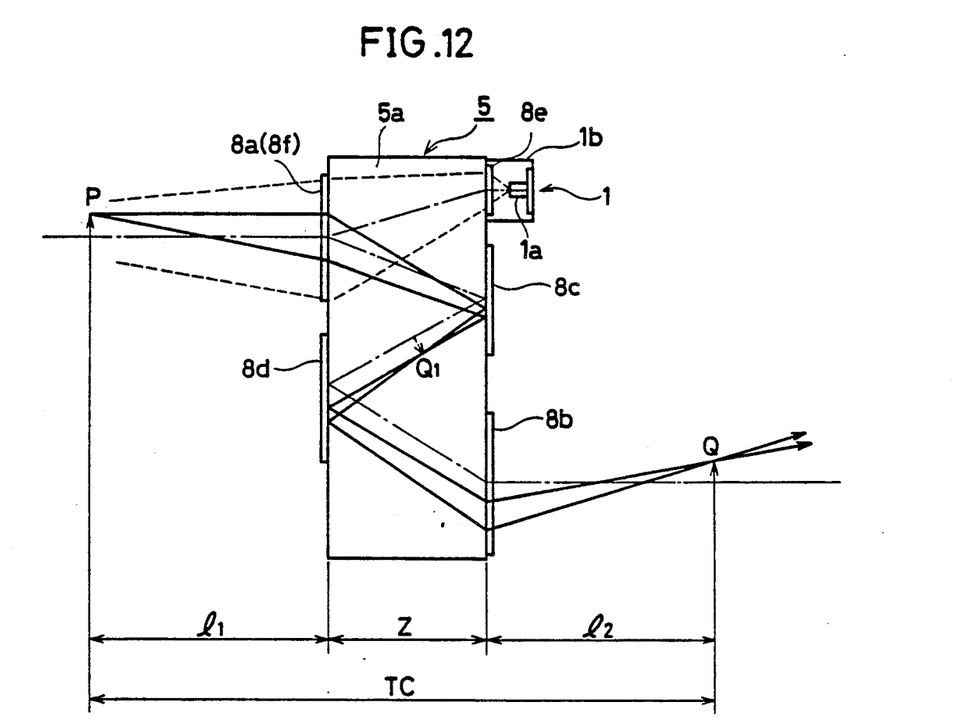
FIG. 12 is a view for illustrating imaging of light from an image by a diffraction element array of an image reading apparatus according to a sixth embodiment of the present invention.

Next, the sixth embodiment of the present invention is a variation of the fifth embodiment described above. In this embodiment, as illustrated in FIG. 12, the diffraction element 8f provided on the surface of the incident plane 6 of the diffraction element array 5 and the diffraction element 8a provided at an incident position of light from an image are integrally formed together to be employed as a converging lens of the light emitting diode 1. In an operation of these diffraction elements 8f and 8a, illumination light directed from the light emitting diode 1 is focused by the diffraction element 8e and therewith diffracted toward the diffraction element 8a provided on the incident plane 6. Since a luminous flux from the light emitting diode 1 is in the same optical path direction as the minus first order diffraction light of the diffraction element 8a, it is diffracted toward an image P and is appropriately converged to illuminate the image. The light reflected from the image P due to this illumination light is again transmitted through the diffraction element 8a to be introduced into the diffraction element array 5. As described above, the diffraction element 8a serves both as a lens for focusing and transmitting the light from the image and as the converging lens for the light emitting diode.

Figure 13:
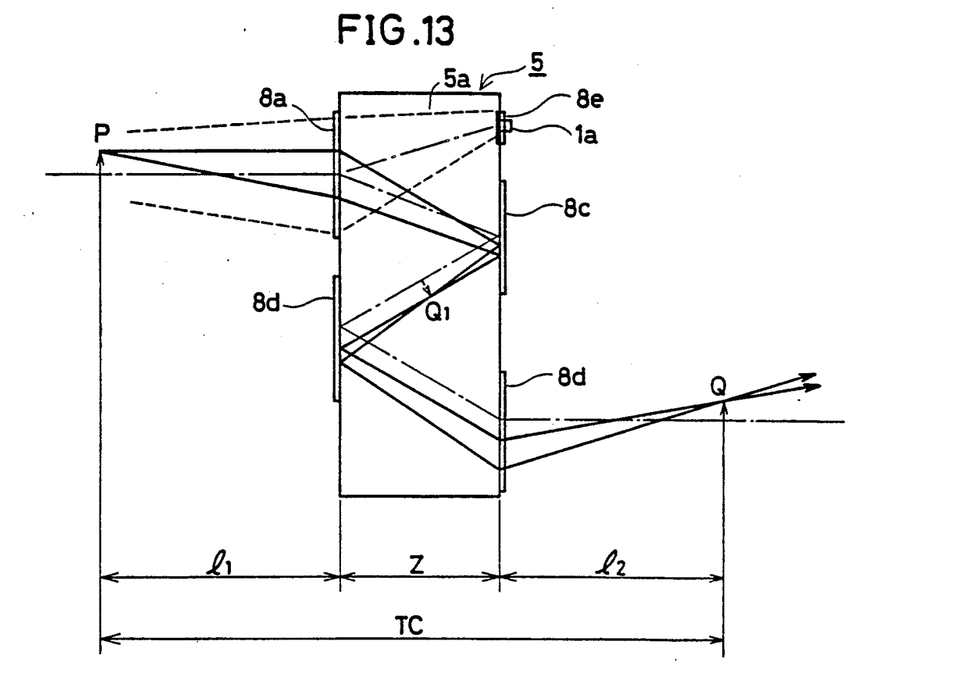
FIG. 13 is a view for illustrating imaging of light from an image by a diffraction element array of an image reading apparatus according to a seventh embodiment of the present invention.

The image reading apparatus according to the seventh embodiment of the present invention, which is a variation of the sixth embodiment described above, is characterized by a simplified structure of the light emitting diode 1. That is, as illustrated in FIG. 13, the semiconductor chip 1a of the light emitting diode 1 is directly and adhesively fixed onto the surface of the diffraction element array 5 at a predetermined position of the emission plane 7 of the array 5. This structure requires no package of the light emitting diode 1 and thus attains the simpler and smaller-size apparatus.

Figure 14:
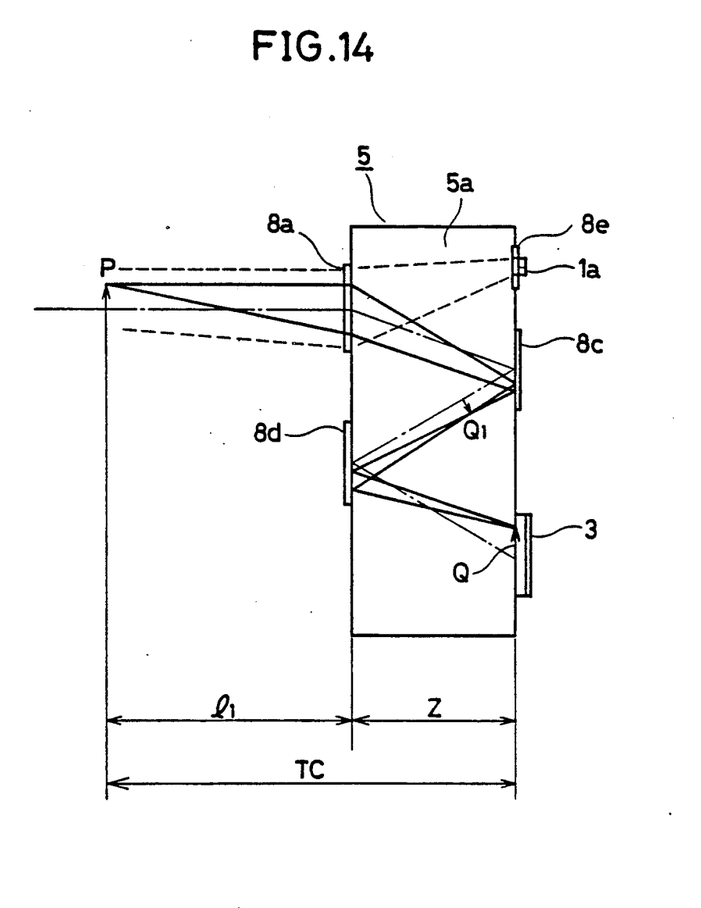
FIG. 14 is a view for illustrating imaging by a diffraction element array of an image reading apparatus according to an eighth embodiment of the present invention.

The image reading apparatus according to the eighth embodiment of the present invention is characterized by integrally forming the line sensor 3 to be attached onto the emission plane 7 of the diffraction element array 5 compared to the seventh embodiment described above. That is, as illustrated in FIG. 14, the line sensor 3 is fixedly attached to a position on the emission plane 7, from which light from an image is emitted outside. The diffraction element 8b which has been provided at this position is omitted. Increasing effects, as lenses, of the respective diffraction elements 8a–8c and 8d, provided on the diffraction element array 5 results in such a structure that the light from the image is imaged on the surface of the line sensor 3 attached onto the emission plane 7 of the diffraction element array 5. This structure requires no differential distance $l_2$ on the side of the object, which is required in the above described embodiment, and thus the conjugate length TC of the diffraction element array 5 is substantially reduced to achieve the reduction in the size of the apparatus. The diffraction grating such as a Fresnel lens or a hologram is employed for the diffraction element in the above embodiment.

As described heretofore, according to the present invention, since a lens array of the image reading apparatus is configured by forming the diffraction elements on the incident plane and the emission plane of the base, an image reading apparatus having a low cost and available for mass production by employing replica manufacturing technology or the like can be implemented.

Furthermore, this embodiment is structured such that the light from the image is bent within the lens array so as to be able to reduce the length of the optical path thereof, the reductions in the thickness of the lens array and in the optical path of the optical system can achieve the reduction in the size of the apparatus.

In the other embodiments of the present invention, the integral formation of the lens array with the light source or the image sensor in the image reading apparatus results in the apparatus with the simplified structure and the reduced size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   a light source for illuminating a surface of an object with illumination light;
   a lens array for focusing light reflected on the surface of said object, transmitting the reflected light and forming an image of said object at a predetermined position; and
   an image sensor provided at said predetermined position for converting said image formed on the surface thereof into an electrical signal to read said image of said object,
   said lens array comprising
   a transparent base having an incident plane in which said reflected light enters and an emission plane from which said reflected light emits,
   a first diffraction element provided at a position in which said reflected light on the side of the incident plane of said base enters, and
   a second diffraction element provided at a position from which said reflected light on the side of the emission plane of said base emits.

2. The image reading apparatus in accordance with claim 1, wherein said base of said lens array comprises a prism including said incident plane, said emission plane, and a reflection plane for reflecting said reflected light incident into said prism.

3. The image reading apparatus in accordance with claim 2, wherein a diffraction element is formed on said reflection plane of said prism.

4. The image reading apparatus in accordance with claim 1, wherein said incident plane and said emission plane of said base each comprise a reflection area for making said reflected light travel within said base by mutually reflecting said reflected light which enters said base, and a third diffraction element is formed in said reflection area.

5. The image reading apparatus in accordance with claim 1,
   wherein said light source comprises
   a light emitting diode integrally provided on said emission plane of said base of said lens array and opposed to said object through said lens array, comprising a semiconductor chip in a package, and
   a fourth diffraction element provided on the surface of said base placed on an optical path of illumination light emitted from said light emitting diode.

6. The image reading apparatus in accordance with claim 5, wherein said first diffraction element doubles as said fourth diffraction element.

7. The image reading apparatus in accordance with claim 1,
   wherein said light source comprises
   a chip of the light emitting diode integrally provided on said emission plane of said base in said lens array and opposed to said object through said lens array and
   the fourth diffraction element provided on the surface of said base and placed on the optical path of the illumination light emitted from the chip of said light emitting diode.

8. The image reading apparatus in accordance with claim 1,
   wherein said image sensor is integrally fixed together with said base at a position from which said reflected light entering said base of said lens array emits outside.

* * * * *